United States Patent
Fujita et al.

(10) Patent No.: US 7,906,932 B2
(45) Date of Patent: Mar. 15, 2011

(54) SIGNAL PROCESSING DEVICE, VELOCITY DETECTING DEVICE AND SERVO MECHANISM

(75) Inventors: Jun Fujita, Mishima (JP); Takamichi Ito, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 916 days.

(21) Appl. No.: 11/768,757

(22) Filed: Jun. 26, 2007

(65) Prior Publication Data

US 2008/0061723 A1 Mar. 13, 2008

(30) Foreign Application Priority Data

Jun. 29, 2006 (JP) ................................. 2006-179186

(51) Int. Cl.
*H02P 23/00* (2006.01)
(52) U.S. Cl. ......... 318/798; 318/602; 318/799; 318/560
(58) Field of Classification Search .................. 318/560, 318/461, 602, 603, 799, 798
See application file for complete search history.

(56) References Cited

U.S. PATENT DOCUMENTS

| 4,330,738 | A | * | 5/1982 | Paramythioti et al. | ........ 318/128 |
| 4,767,973 | A | * | 8/1988 | Jacobsen et al. | .............. 318/652 |
| 5,327,030 | A | * | 7/1994 | DeVito et al. | ................. 327/355 |
| 5,900,709 | A | * | 5/1999 | Kanda et al. | ................... 318/652 |
| 6,552,666 | B1 | * | 4/2003 | Goto et al. | ............... 340/870.32 |

FOREIGN PATENT DOCUMENTS

| JP | 2004-005218 A | 1/2004 |
| JP | 2006-201148 A | 8/2006 |

* cited by examiner

*Primary Examiner* — Rina I Duda
(74) *Attorney, Agent, or Firm* — DLA Piper LLP US

(57) ABSTRACT

A driving velocity of a motor is detected by processing a position information signal output from a sensor in accordance with a driving position of a motor. The signal processing device includes a position information signal processor (410) that processes the position information signal and calculates driving velocity information of the motor, and an internal position information generator (460) that reflects a latest driving velocity information ($\omega_n$) calculated by the position information signal processor (410) and generates a latest presumed position of the motor as internal position information. An amplitude correcting unit (465) detects the amplitude of the position information signal from the sensor and corrects the amplitude of the internal position information signal based on the detected amplitude.

4 Claims, 9 Drawing Sheets

FIG. 6

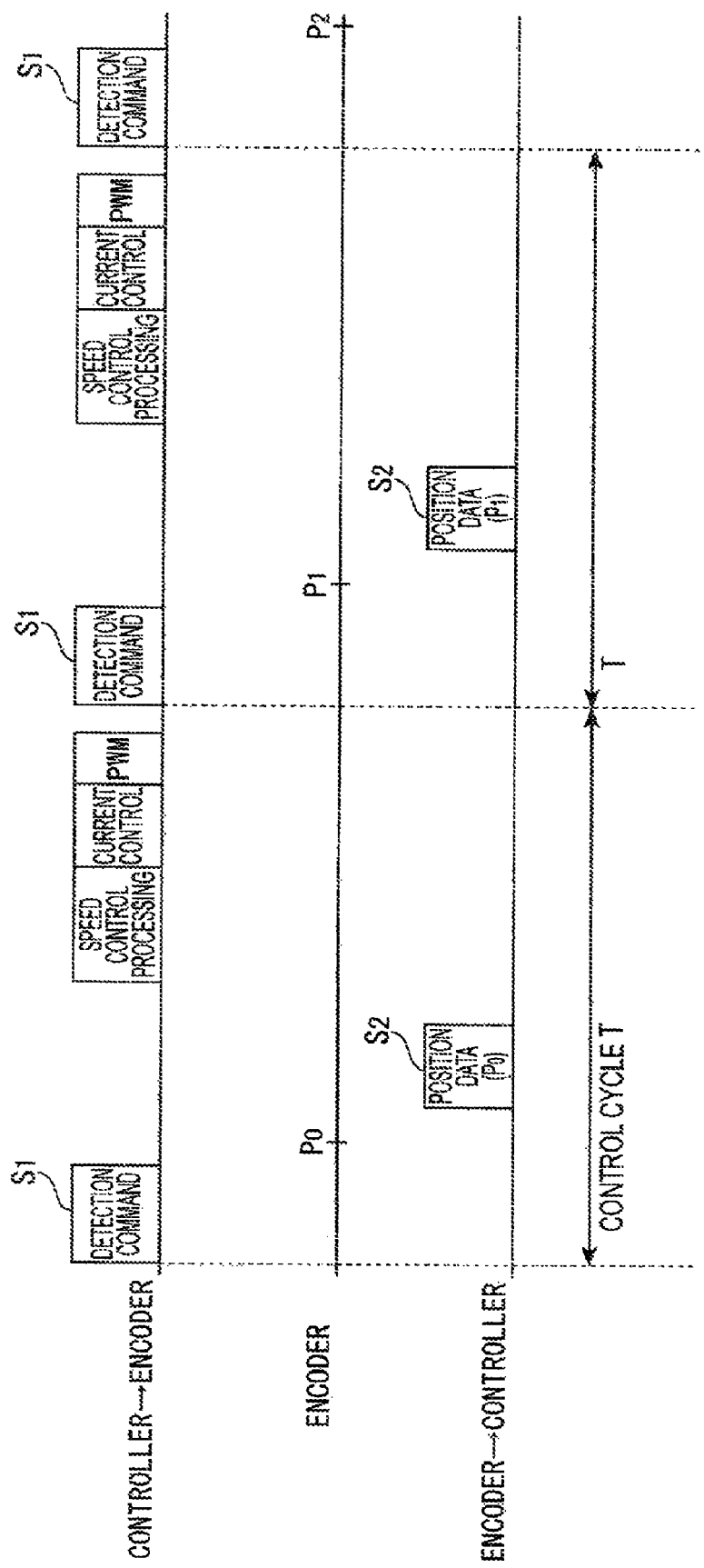

SIGNAL PROCESSING DEVICE, VELOCITY DETECTING DEVICE AND SERVO MECHANISM

BACKGROUND OF THE INVENTION

1. Field of the Invention

The present invention relates to a signal processing device, in particular, the present invention relates to a signal processing device and a velocity detecting device, each processing a two-phase signal from an encoder that detects a rotation angle of a motor and detecting a driving velocity (a rotation angular velocity) of the motor, as well as to a servomechanism controlling the driving velocity of the motor.

2. Description of Related Art

There has been known a servomechanism that controls a driving velocity (for instance, a relation velocity) of a motor (e.g. Document: JP-A-2004-5218).

As shown in FIG. 9, a conventional servomechanism 1 includes a motor 11 (an object to be controlled), an encoder 12 that detects a rotation position (a rotation angle) of the motor 11 and outputs a position data, and a controller 13 that calculates a motor rotation velocity based on the position data from, the encoder 12 and controls current to be applied to the motor 11 to achieve a target velocity.

The encoder 12 detects the rotation position (the rotation angle) of the motor 11, latches the detected value and outputs information on the rotation position of the motor 11 using an absolute code. The encoder 12 connects to the controller 13 via a serial communication line 14.

FIG. 10 shows a timing chart of rotation velocity control by the motor 11 in the servomechanism having the above-described configuration.

First, the controller 13 sends a command St for detecting the position to the encoder 12 via the serial communication line 14. Upon receiving the detection command $S_1$, the encoder 12 detects the rotation position of the motor 11 (denoted as $P_0, P_1, P_2$ in FIG. 10), latches the detected value, and outputs the position data of the motor 11 to the controller 13.

When receiving the rotation position data of the motor 11 from the encoder 12, the controller 13 controls the velocity of the motor 11 based on the motor rotation position. To be more specific, the controller 13 compares the motor rotation position currently received with the motor rotation position received one-cycle before, calculates the rotation velocity of the motor 11, and compares the calculated motor rotation velocity with the target velocity. Then, the controller 13 calculates an electric current value to be applied to the motor 11 corresponding to a difference between the motor velocity and the target velocity, and flows the current value by an electric current control amplifier to control the velocity of the motor 11.

The above control cycles are repeated, so that the rotation velocity of the motor 11 achieves the target velocity.

However, if the velocity control is based on such motor velocity calculated from the difference between the two pieces of motor rotation position data detected according to predetermined sampling cycles, the obtained velocity data is a mean velocity data of the velocity at the current control cycle and the velocity at one-cycle before. In other words, the velocity control may have time-lag (time-delay) of ½ of a sampling cycle T. The time-lag causes phase-delay of the control system, thus destabilizing the control.

SUMMARY OF THE INVENTION

An object of the present invention is to provide a signal processing device and a velocity detector, each obtaining a driving velocity of an object to be controlled promptly based on a signal from an encoder, as well as a servomechanism that stably controls the driving velocity of the motor.

A signal processing device according to an aspect of the invention is for processing a position information signal output from a sensor in accordance with a driving position of a driver and detecting a driving velocity of the driver, the signal processing device including: a position information signal processor that processes the position information signal to calculate the driving velocity information of the driver; and an internal position information generator that reflects a latest driving velocity information calculated by the position information signal processor to generate a latest presumed position of the driver as the internal position information, in which the position information signal output from the sensor is a periodic function signal periodically changing in accordance with drive of the driver, the position information signal processor calculates the driving velocity information of the driver based on a difference between the position information signal from the sensor and the internal position information generated by the internal position information and outputs a phase change amount of the periodic function signal as the driving velocity information of the driver, the internal position information generator includes an integrator that integrates the phase change amount from the position information signal processor to calculate the phase corresponding to the position information of the driver and an internal position information converter that calculates the function value based on the phase calculated by the integrator and converts the phase into the internal position information, and the internal position information converter includes an amplitude detector that detects the amplitude of the position information signal output by the sensor, a function value calculator that calculates the function value of the periodic function taking the phase calculated by the integrator as a parameter, and an amplitude multiplier that multiplies the function value calculated by the function value calculator by the amplitude detected by the amplitude detector to calculate the internal position information.

According to the above arrangement, the position information of the driver reflecting the latest driving velocity information of the driver is generated as the internal position information by the internal position information generator. When the position information signal is input from the sensor, the difference between the position information signal and the internal position information is instantaneously calculated by the position, information signal processor. The driving velocity of the driver is calculated based on the difference and output. The driving velocity is output to, for instance, a controller provided outside as the driving velocity information of the driver, and at the same time, is input to the internal position information generator for presuming a latest position of the driver.

In response to the position information signal input by the sensor, the phase change amount is calculated by the position information signal processor as the driving velocity information. The driving velocity information (phase change amount) is integrated by the integrator to calculate the phase corresponding to the position information of the driver and the periodic function value corresponding to the phase is calculated by the internal position information, converter as the internal position information. Hence, the difference between the input position information signal and the internal position information is instantly calculated by processing the position, information signal, thereby obtaining the velocity information without the time-lag relative to the input position information.

The position information signal output by the sensor is a periodic function. However, the amplitude of the position information signal may change in accordance with various conditions such as frequency thereof.

If the amplitude of the signal differs between the internally-generated internal position, information and the position information from the sensor, the difference between the position information signal from the sensor and the internal position information generated by the internal position information generator calculated by the position information signal processor includes deviation of the amplitude in addition to the difference in the phase (driving velocity information).

Accordingly, the driving velocity information cannot be accurately calculated.

In this regard, the amplitude detector is provided in the present invention to detect the amplitude of the position information signal output by the sensor.

The function value calculated by the function value calculator is multiplied by the detected amplitude to adjust the amplitude of the internal position information at the same level as the signal from the sensor.

Accordingly, the amplitude of the position information signal from the sensor coincides with the amplitude of the internal position information that is internally generated.

Accordingly, when the difference between the position information from the sensor and the internal position information generated by the internal position information generator is calculated, the difference in the position, information can be independently calculated, so that the driving velocity information of the driver can be accurately obtained.

In the present invention, it is preferable that the periodic function signal is trigonometric functions having phase difference of ninety degrees including a first signal as a sine wave signal and a second signal as a cosine wave signal, the amplitude detector detects the magnitude of the first signal when the value of the second signal is zero as the amplitude of the first signal and detects the magnitude of the second signal when the value of the first signal is zero as the amplitude of the second signal.

According to the above arrangement, when the periodic function signal as the position information from the sensor is two-phase signal, the amplitude of the first signal is detected as the value of the first signal when the value of the second signal becomes zero. Similarly, the amplitude of the second signal is detected as the value of the second signal when the value of the first signal, becomes zero. For instance, when the first signal is $A_i \sin \theta$, the first signal ($A_i \sin \theta$) can be obtained by detecting $|A_i \sin \theta|$ when the value of $B_i \sin \theta$ (second signal)=0.

When the two-phase signal is used, the amplitude of the signal can be easily detected with the use of the fact that one of the signals shows the maximum value (or minimum value) when the value of the other signal becomes zero.

As compared with a conventional arrangement where, for instance, the change in the first signal is sequentially recorded and the maximum value is obtained as the amplitude on detecting that increase in the value of the first signal turns to decrease, the amplitude can be detected with considerably simple arrangement.

Incidentally, when the driving velocity is detected based on only one of the sine wave signal and the cosine wave signal, it goes without saying that the amplitude of only one of the sine wave signal and the cosine wave signal is detected, in this case, in order to detect the amplitude of the first signal, the amplitude of the first signal when the value of the second signal becomes zero is detected while monitoring the value of the second signal.

The amplitude is preferably detected by the amplitude detector at as short a sampling pitch as possible. However, when the sensor is a rotary encoder, since the change in the amplitude of the position information signal is relatively slow, an effect of the present invention can be exhibited even if the amplitude is detected by a few milliseconds to a few tens of milliseconds.

Incidentally, a predetermined signal-processing program may be installed so that the computer operates as the respective functional parts of the signal processing device. If such signal processing program is installed in the computing unit and the computing unit is operated as the respective functional parts, for instance, various parameters can easily be changed. The signal processing program may be installed by inserting a memory card, a CD-ROM or the like to the signal processing device, or by connecting equipment for reading the recording medium to the signal processing device. Otherwise, the signal processing program may be installed by connecting a telephone line or the like to the signal processing device and acquiring the program via communication, or by acquiring the program wirelessly.

A velocity detector according to another aspect of the present invention includes a sensor that outputs a position information signal in accordance with a drive position of a driving body and the above signal-processing device.

With this configuration, there can be provided the velocity detector in which the signal processing device processes the position information signal from the sensor to obtain the driving velocity of the driver promptly.

A servomechanism according to another aspect of the invention includes: a driver; a sensor that outputs a position information signal corresponding to a driving position of a driver; a signal-processing device that processes the position information signal to detect a driving velocity of the driver; and a central controller that compares the driving velocity of the driver detected by the signal-processing device with a predetermined target velocity that is set in advance from an outside, the central controller controlling the driving velocity of the driver at the target velocity.

With this configuration, the central processing unit can control the driver applying the driving velocity information obtained by the signal processing device as the feedback signal. Consequently, the control system can remarkably stably be controlled since there is no phase-delay.

BRIEF DESCRIPTION OF THE DRAWINGS

FIG. 6 is a block diagram showing the configuration of a velocity calculator (a signal processing device) according to a second embodiment of the present invention;

FIG. 10 is a timing chart of rotation velocity control of a motor in the conventional servomechanism.

DETAILED DESCRIPTION OF PREFERRED EMBODIMENT(S)

Figure 1:
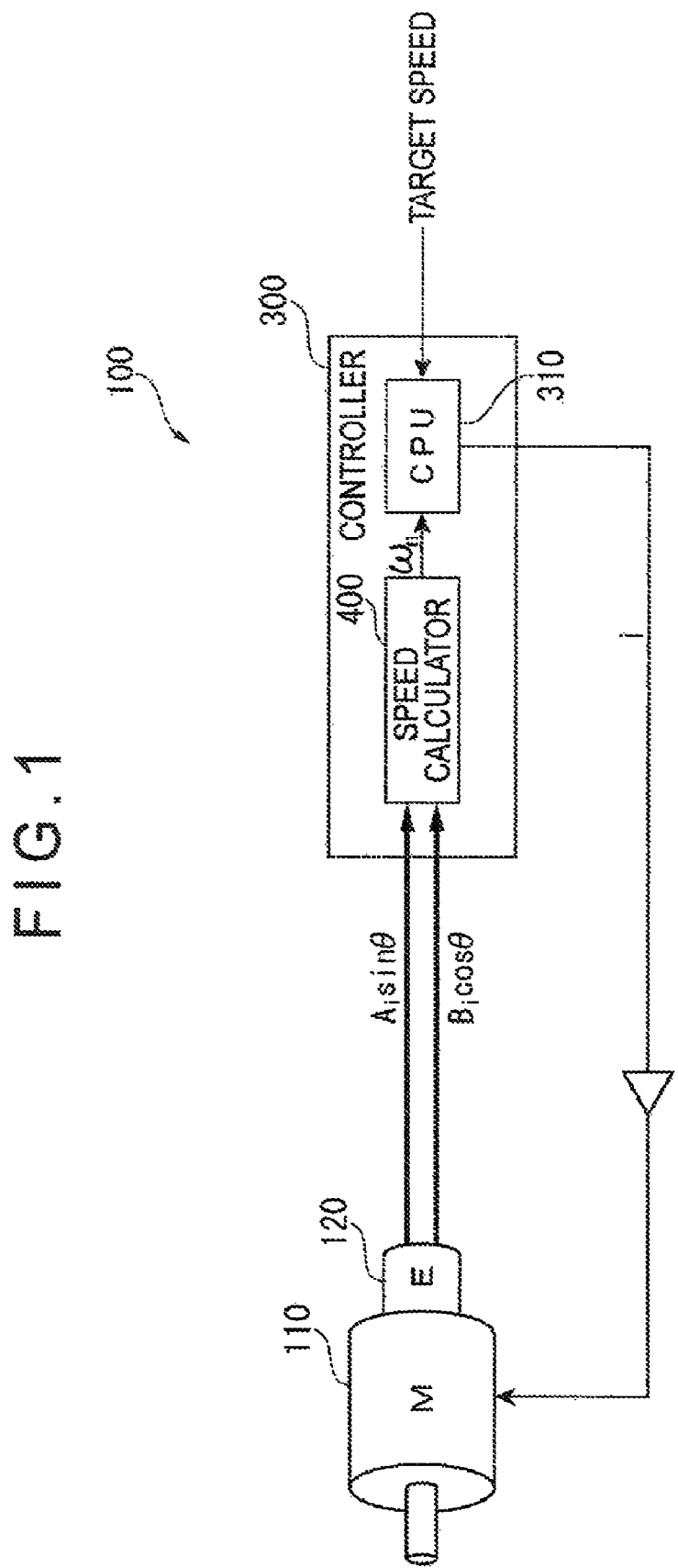
FIG. 1 is a block diagram of a first embodiment drawn to a servomechanism of the present invention.

Embodiments of the present invention will be illustrated and described with reference to reference characters given to respective elements in the drawings.

First Embodiment

A first embodiment of a servomechanism of the present invention will be described below.

FIG. 1 is a block diagram of the servomechanism.

A servomechanism 100 includes a motor (driver) 110 as an object to be controlled, an encoder 120 as a sensor that outputs a position information signals (a periodic function signal) of both a sine wave (A sin θ) and a cosine wave (A cos θ) in accordance with rotation of the motor 110, and a controller 300 that calculates a motor rotation velocity (driving velocity information) based on the position information signal from the encoder 120 and controls the motor rotation velocity to achieve a target velocity input from the outside.

Figure 2:
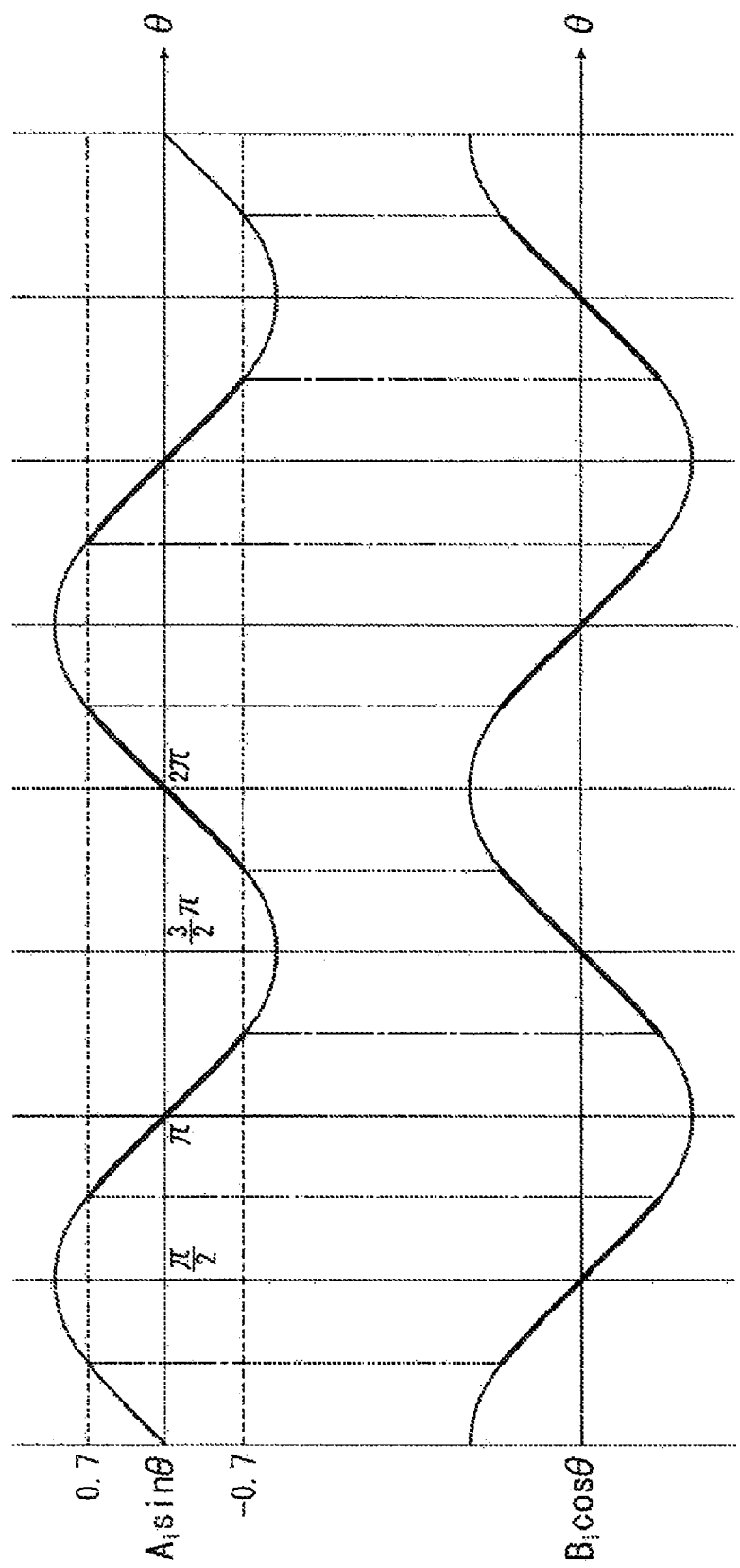
FIG. 2 is an illustration of a two-phase signal output from an encoder in the first embodiment.

Though not described in detail, the encoder 120 is the known rotary encoder 120, which has a rotor integrally rotating with a rotator of the motor 110 and outputs the position information signal (A sin θ, A cos θ), i.e., a periodic function periodically changing in accordance with the rotation of the rotor. As shown in FIG. 2, the position information signal is a two-phase signal containing a sine wave (A sin θ) and a cosine wave (A cos θ) having 90° phase difference with each other. The rotary encoder 120 may be a photoelectric encoder, a capacitance encoder, a magnetic encoder or the like.

The controller 300 includes a velocity calculator 400 as a signal processing device that processes the position information signal from the encoder 120 and calculates the motor rotation velocity, and a CPU 310 as a central processing unit that compares the motor rotation velocity calculated by the velocity calculator 400 with the target velocity input from the outside and controls the motor rotation velocity to achieve the target velocity.

The configuration of the velocity calculator 400 will be described below.

Figure 3:
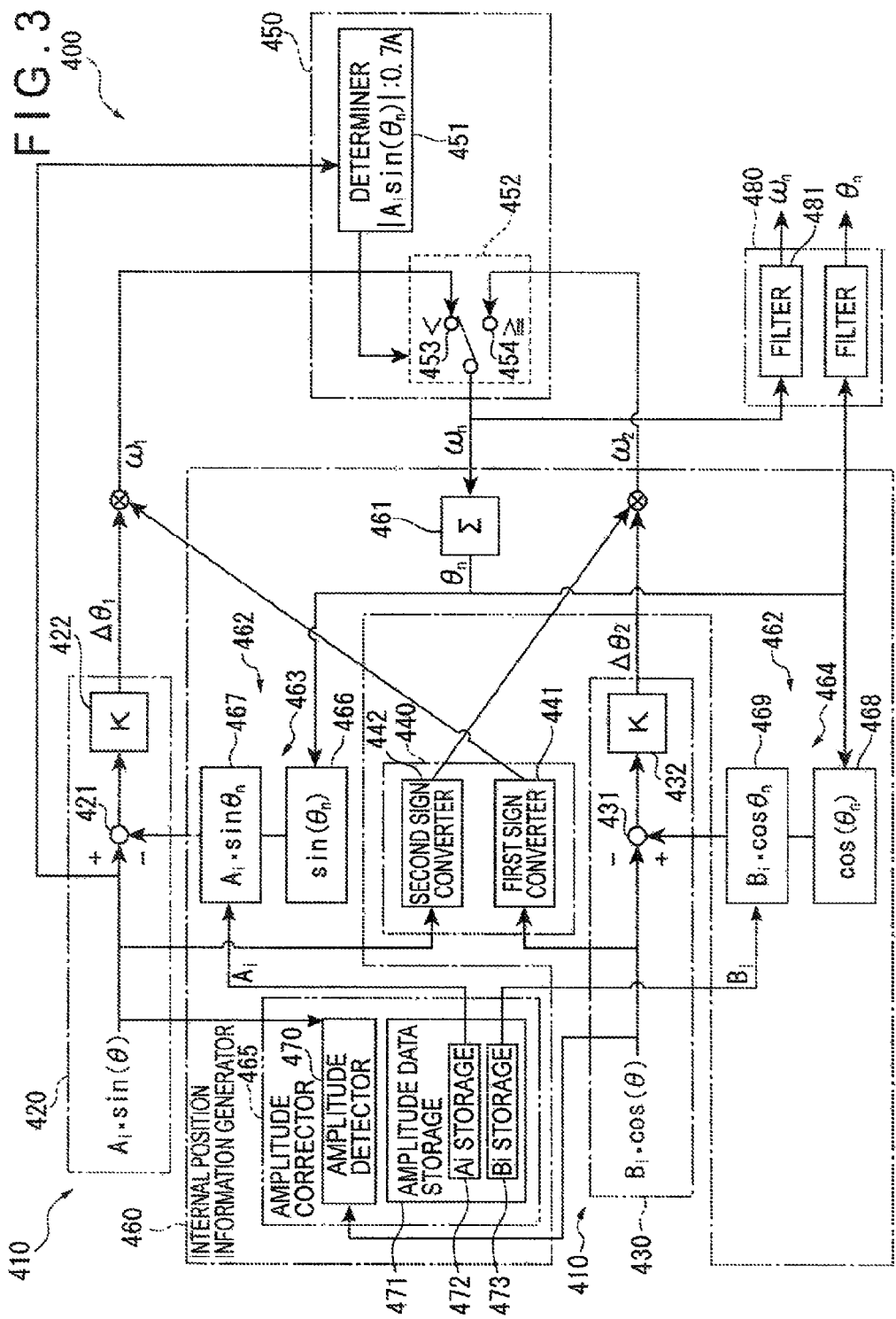
FIG. 3 is a block diagram showing the configuration of a velocity calculator in the first embodiment.

FIG. 3 is a block diagram showing the configuration of the velocity calculator 400.

The velocity calculator 400 includes a position information signal processor 410 that processes the two-phase signal ($A_i$ sin θ, $A_i$ cos θ) output from the encoder 120 and calculates the motor rotation velocity ($\omega_a$), a signal switching section 450 that selects the motor rotation velocity information based on either one of the two-phase signal by comparing with a predetermined condition, an internal position information generator 460 that generates motor driving position information ($\omega_n$) reflecting a latest motor rotation velocity as internal, position information based on the motor rotation velocity ($\omega_n$) from the position information signal processor 410, and an output unit 480 that outputs the motor rotation velocity information ($\omega_n$) and the motor driving position information ($\omega_n$) of the motor 110.

The position information signal processor 410 includes a sine signal processor (a first signal processor) 420 that processes the sine wave signal ($A_i$ sin θ) contained in the two-phase signal output from the encoder 120 and calculates a rotation changing amount ($\Delta\theta_1$) of the motor 110, a cosine signal processor (a second signal processor) 430 that processes the cosine wave signal ($A_i$ cos θ) contained in the two-phase signal output from the encoder 120 and calculates a rotation changing amount ($\Delta\theta_2$) of the motor 110, and a sign converter 440 that converts the rotation changing amounts ($\Delta\theta_1$, $\Delta\theta_2$) respectively from the sine signal processor 420 and the cosine signal processor 430 into rotation angular velocities ($\omega_1$, $\omega_2$ (rad/s)) of the motor 110 according to a normal rotation direction.

The sine signal processor 420 includes a first subtracter (a difference calculator) 421 that subtracts the internal position information ($A_i$ sin θ) generated by the internal position information generator 460 from the sine wave signal ($A_i$ sin θ) input by the encoder 120 to output a difference signal, and a first gain multiplier (a driving velocity calculator) 422 that multiplies the difference signal output from the first subtracter 421 by a predetermined gain (K) to calculate the motor rotation changing amount ($\Delta\theta_1$).

The first subtracter 421 subtracts the motor driving position information (the internal position Information $A_i$ sin $\theta_n$) generated by the internal position information generator 460 from the sine wave signal ($A_i$ sin θ) input from the encoder 120.

The difference calculated by the first subtracter 421 is a difference of a function value ($A_i$ sin θ–$A_i$ sin $\theta_n$), and then, the first gain multiplier 422 multiplies the difference signal output from the first subtracter 421 by the predetermined gain (K) to output the rotation changing amount ($\Delta\theta_1$) of the motor 110.

The cosine signal processor 430 includes a second subtracter (a difference calculator) 431 that subtracts the cosine wave signal ($B_i$ cos θ) input by the encoder 120 from the internal position information ($B_i$ cos $\theta_n$) generated by the internal position information generator 460 to output a difference signal, and a second gain multiplier (a driving velocity calculator) 432 that multiplies the difference signal output from the second subtracter 431 by the predetermined gain (K) to calculate the motor rotation changing amount ($\Delta\theta_2$).

The sign, converter 440 includes a first sign converter 441 that converts the motor rotation changing amount ($\Delta\theta_1$) output from the sine signal processor 420 based on a sign of the cosine wave signal ($B_i$ cos θ), and a second sign converter 442 that converts the motor rotation changing amount ($\Delta\theta_2$) output from the cosine signal processor 430 based on a sign of the sine wave signal (A sin θ).

The first sign converter 441 multiplies the motor rotation changing amount ($\Delta\theta_1$) from the first gain multiplier 422 by −1 (minus 1) when the cosine wave signal (A cos θ) is minus (a negative value), and multiplies the motor rotation changing amount ($\Delta\theta_1$) from the first gain multiplier 422 by +1 (plus 1) when the cosine wave signal (A cos θ) is plus (a positive value).

Similarly, the second sign converter 442 multiplies the motor rotation changing amount ($\Delta\theta_2$) from die second gain multiplier by −1 (minus 1) when the sine wave signal (A sin θ) is minus (a negative value), and multiplies the motor rotation changing amount ($\Delta\theta_2$) from the second gain multiplier by +1 (plus 1) when the sine wave signal (A sin θ) is plus (a positive value).

In a ease where the sine wave signal (A sin θ) input from the encoder 120 repeatedly increases/decreases periodically in accordance with the rotation of the motor 110 as shown in FIG. 2, there is a region where the sine wave signal (A sin θ) decreases even when the rotation phase angle increases along with the rotation of the motor 110. Therefore, if the internal position information (A sin $\theta_n$) generated by the internal position information generator 460 is simply subtracted from the input sine wave signal (A sin θ), the rotation changing amount of the motor 110 may possibly be minus although the phase increases along with the normal rotation of the motor 110. To avoid this, the first sign converter 441 converts the sign of the output signal from the first gain multiplier 422 in an increasing direction of the rotation changing amount ($\Delta\theta_1$) of the motor 110, based on the sign of the cosine wave signal (A cos θ), i.e., the other signal contained in the two-phase signal input from the encoder 120. Accordingly, the motor rotation changing amount ($\Delta\theta_1$) output from the first gain multiplier 422 is constantly converted in the increasing direction, so that the rotation angular velocity ($\omega_1$) of the motor 110 can be obtained.

Similarly, the second sign converter 442 converts the sign of the signal output from the second gain multiplier 432 in the increasing direction of the rotation changing amount ($\Delta\theta_2$) of the motor 110, based on the sign of the sine wave signal (A sin θ), i.e. the other signal contained in the two-phase signal input from the encoder 120. Accordingly, the motor rotation changing amount ($\Delta\theta_2$) output from the second gain multiplier 432 is constantly converted in the increasing direction, so that the rotation angular velocity ($\omega_2$) of the motor 110 can be obtained.

The signal switching section 450 includes a determiner 451 that compares the sine wave signal (A sin θ) input from the encoder 120 with a predetermined threshold and determines whether the sine wave signal is greater or smaller than the threshold, and a switcher 452 that switches the input to the output unit and the internal position information generator 460 to/from the output signal of the sine signal processor 420 from/to the output signal of the cosine signal processor 430.

In a case where the position information signal (A sin θ, A cos θ) input from the encoder 120 increases/decreases periodically in accordance with the rotation of the motor 110, as exemplary shown in FIG. 2, there is a region where the signal value change of the sine wave signal (A sin θ) (or the cosine wave signal (A cos θ)) is small relative to the phase changing amount, for instance, the changing amount of the signal value becomes small relative to the changing amount of the phase (θ) when the phase is around 90° ($\pi/2$) or around 270° ($3\pi/2$) as for the sine wave signal (A sin θ).

To solve this, the signal switching section 450 switches between the sine wave signal (A sin θ) and the cosine wave signal (A cos θ) to utilize the region where the change in the signal value is great relative to the phase changing amount.

The determiner 451 compares the absolute value |A sin θ| of the sine wave signal with 0.7 A as a predetermined threshold, and determines whether the value is greater or smaller than the threshold. Here, ±0.7 substantially corresponds to $\pm\sqrt{2}/2$, and as for the sine wave signal ±0.7 corresponds to 45° ($\pi/4$), 135° ($3\pi/4$), 225° ($5\pi/4$) and 315° ($9\pi/4$).

The switcher 452 includes a sine terminal 453 to which the signal from the sine signal processor 420 is input, and a cosine terminal 454 to which the signal from the cosine signal processor 430 is input, the switcher 452 being formed of a switching unit that switches the input to the internal position information generator 460 and the output unit 480 to/from the sine terminal 453 from/to the cosine terminal 454.

The signal switching section 450 selects the sine terminal 453 if |A sin θ| is smaller than 0.7 A (|A sin θ|<0.7 A|), and selects the cosine terminal 454 if |A sin θ| is or greater than 0.7 A, based on the determination by the determiner 451.

Owing to this, as shown in FIG. 2, the sine wave signal (A sin θ) or the cosine wave signal (A cos θ) with the region where the signal value change is greater than that of the other signal is sequentially selected.

The internal position Information generator 460 includes an integrator 461 that integrates the motor rotation angular velocity ($\omega_1$, $\omega_2$) from the position information signal processor 410 to calculate the rotation phase ($\theta_n$) of the motor 110, and an internal position information converter 462 calculates the internal position information (A sin $\theta_n$, A cos $\theta_n$) by converting into a trigonometric function value applying the rotation phase ($\theta_n$) of the motor 110 calculated by the integrator 461 as a parameter.

The integrator 461 integrates the motor rotation angular velocity ($\omega_1$ or $\omega_2$) which is the output signal selected by the switcher 452 to calculate the rotation phase ($\theta_n$) of the motor 110. Namely, the integrator 461 calculates the motor rotation phase ($\theta_n$) reflecting a latest motor rotation angular velocity ($\omega_1$, $\omega_2$). Then, the integrator 461 outputs the calculated motor rotation phase ($\theta_n$) to the infernal position information converter 462.

The internal position information converter 462 includes: a first internal position information converter 463 for outputting the internal position information ($A_i$ sin $\theta_n$) to the first subtracter 421 of the sine signal processor 420; a second internal position information converter 464 for outputting the internal position information ($B_i$ cos $\theta_n$) to the second subtracter 431 of the cosine signal processor 430; and an amplitude corrector 465 for detecting respective amplitude ($A_i$, $B_i$) of the sine wave signal ($A_i$ sin θ) output by the encoder 120 and the cosine wave signal ($B_i$ cos θ) and correcting the amplitude ($A_i$, $B_i$) of the first and the second internal position information converter 463 and 464.

The first internal position information converter 463 calculates a sine function value ($A_i$ sin $\theta_n$) applying the phase ($\theta_n$) calculated by the integrator 461 as a parameter to obtain as the internal position information, corresponding to the sine wave signal ($A_i$ sin θ) as the position Information signal input from the encoder 120.

The second internal position information converter 464 calculates a cosine function value ($B_i$ cos $\theta_n$) applying the phase ($\theta_n$) calculated by the integrator 461 as a parameter to obtain as the internal position information, corresponding to the cosine wave signal ($B_i$ cos $\theta_n$) as the position information signal input from the encoder 120.

The first and die second internal position information converters 463 and 464 have function value calculators 466 and 468 for calculating a function value (sin $\theta_n$, cos $\theta_n$) taking the phase ($\theta_n$) calculated by the integrator 461 as a parameter, and amplitude multipliers 467 and 469 for calculating trigonometric function value ($A_i$ sin θ, $B_i$ cos θ) multiplied by the amplitude output by the amplitude corrector 465.

The first internal position information converter 463 includes a first function value calculator 466 and a first amplitude multiplier 467. The second internal position information converter 464 includes a second function value calculator 468 and a second amplitude multiplier 469.

The motor rotation phase (θn) calculated by the integrator 461 is initially input to the function value calculators 466 and 468. Then, the trigonometric function value (sin $\theta_n$, cos $\theta_n$) taking the rotation phase ($\theta_n$) as a parameter is calculated by the function value calculators 466 and 468. At this time, the amplitude of the trigonometric function value is "1". The function value (sin $\theta_n$, cos $\theta_n$) calculated by the function value calculators 466 and 468 is input into the amplitude multipliers 467 and 469.

The amplitude of the trigonometric function value ($A_i$, $B_i$) is output to the amplitude multipliers 467 and 469 from, the amplitude corrector 465. The amplitude multipliers 467 and

469 multiply the function value (sin $\theta_n$, cos $\theta_n$) input from the amplitude corrector 465 by the amplitude ($A_i$, $B_i$) input by the amplitude corrector 465.

In a case where die integrator 461 integrates the motor rotation angular velocity ($\omega_1$, $\omega_2$) output from the position information signal processor 410 and calculates the rotation phase ($\theta_n$) of the motor 110, the integrator 461 sequentially integrates even the latest motor rotation angular velocity ($\omega_1$, $\omega_2$) output from the position information signal processor 410, and then calculates the motor rotation phase ($\theta_1$) as the latest as presumable. Accordingly, the first and second internal position information converters 463, 464 calculate the trigonometric function values ($A_i$ sin $\theta_n$, $B_i$ cos $\theta_n$) of the latest motor rotation phase ($\theta_n$) calculated by the integrator 461, thereby obtaining the trigonometric function values ($A_i$ sin $\theta_n$, $B_i$ cos $\theta_n$) for the motor rotation phase ($\theta_n$) as latest as presumable.

Figure 4:
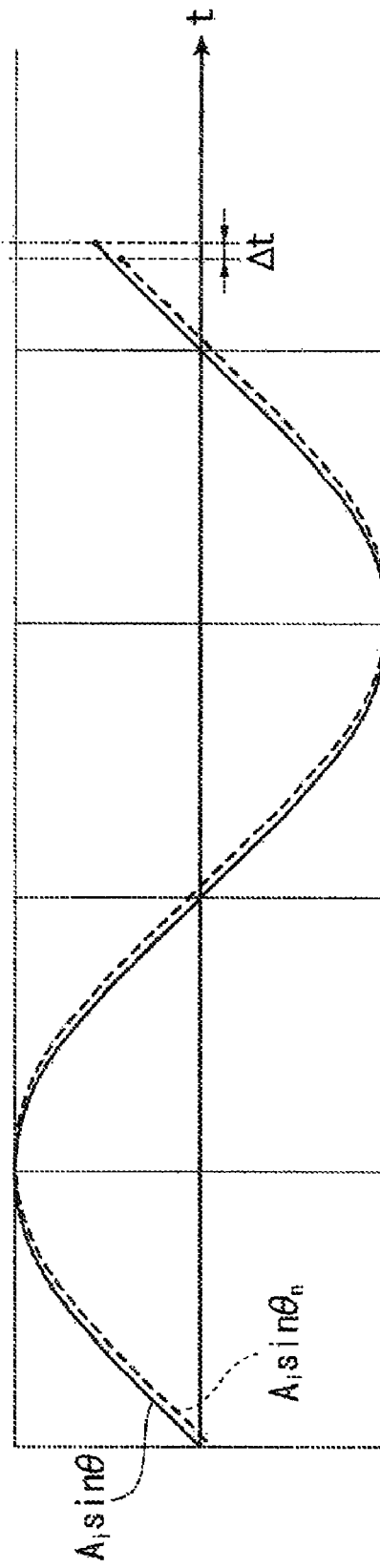
FIG. 4 is an illustration showing a relationship between a sine wave signal ($A_i \sin \theta$) input from the encoder and an internal position information ($A_i \sin \theta_n$) generated by an internal position information generator.

FIG. 4 is an illustration showing the relationship between the sine wave signal ($A_i$ sin $\theta$) input from the encoder and the internal position information ($A_i$ sin $\theta_n$) generated by the internal position information generator.

The amplitude corrector 465 has an amplitude detector 470 for detecting the magnitude of the respective amplitudes of the sine wave signal and the cosine wave signal, and an amplitude data, storage 471 for storing the detected magnitude of the respective amplitudes.

The amplitude detector 470 detects respective amplitudes of the sine wave signal and the cosine wave signal of the two-phase signal output by the encoder.

In order to detect the amplitude, the amplitudes of the sine wave signal and the amplitude of the cosine wave signal are detected, where the amplitude $A_i$ of the sine wave signal is detected as the magnitude $|A_i \sin \theta|$ when the value of the cosine wave signal is "0".

Figure 5:
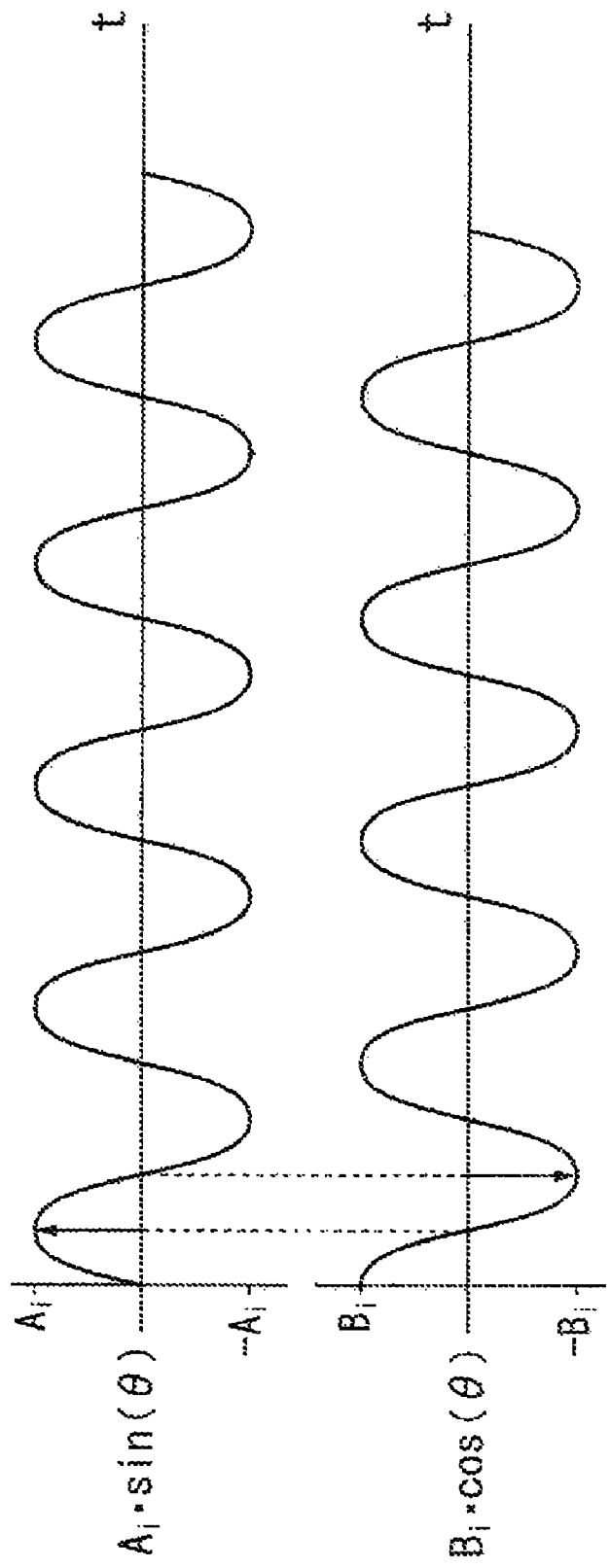
FIG. 5 is an illustration showing a relationship between an amplitude of sine wave and an amplitude of cosine wave.

Similarly, the amplitude $B_i$ of the cosine wave signal is detected as the magnitude $|B_i \sin \theta|$ when the value of the sine wave signal is "0" (see FIG. 5).

The amplitude data storage 471 includes an $A_i$ storage for storing the amplitude $A_i$ of the sine wave signal detected by the amplitude detector 470 and a $B_i$ storage 473 for storing the amplitude $B_i$ of the cosine wave signal.

The amplitude data storage 471 updates the stored data by the latest amplitude data detected by the amplitude detector 470. The $A_i$ storage 472 outputs the amplitude $A_i$ of the stored sine wave to the first amplitude multiplier 467.

The $B_i$ storage 473 outputs the amplitude $B_i$ of the stored cosine wave to the second amplitude multiplier 469.

The output unit 480 outputs the motor rotation angular velocity which is the output signal selected by the switcher 452 to the CPU 310 (a central processing unit) via a filter 481.

The filter 481 may be a low-pass filter.

And, the output unit 480 outputs the motor rotation phase ($\theta_n$) calculated by the Integrator 461, as motor driving position information.

The CPU 310 (the central processing unit) compares the motor rotation angular velocity from the velocity calculator 400 with the target velocity input from the outside, calculates a duty ratio of current (i) to be applied to the motor 110 so that the motor rotation angular velocity ($\omega$) achieves the target velocity, and performs PWM (pulse width modulation) control for the motor 110.

Now, operation of the servomechanism with such configuration will be described below.

When the motor 110 rotates, the encoder 120 detects the rotation of the motor 110 and outputs the two-phase signal ($A_i$ sin $\theta$, $B_i$ cos $\theta$) periodically changing in accordance with the rotation of the motor 110.

The two-phase signal ($A_i$ sin $\theta$, $B_i$ cos $\theta$) from the encoder 120 is input to the sine signal processor 420 and the cosine signal processor 430.

In the following description, since the processing of the sine wave signal ($A_i$ sin $\theta$) is similar to that of the cosine wave signal ($A_i$ cos $\theta$), the processing of the sine wave signal ($A_i$ sin $\theta$) is exemplified for explaining the operation.

The first subtracter 421 compares the sine wave single ($A_i$ sin $\theta$) input to the sine signal processor 420 with the internal position information ($A_i$ sin $\theta_n$) generated by the first internal position information converter 463, and outputs the difference between them to the first gain multiplier 422.

The first gain multiplier 422 multiplies the difference signal from the first subtracter 421 by the predetermined gain (K), and outputs the motor rotation changing amount ($\Delta\theta_1$).

Then the first sign converter 441 multiplies the motor rotation changing amount ($\Delta\theta_1$) front the first gain multiplier 422 by +1 or −1 based, on the sign of the cosine wave signal ($B_i$ cos $\theta$) which is the other signal contained in the two-phase signal to convert the motor rotation changing amount ($\Delta\theta_1$) in the increasing direction, and generates the motor rotation angular velocity ($\omega_1$).

Similarly, the motor rotation angular velocity ($\omega_2$) is generated based on the cosine wave signal ($B_i$ cos $\theta$) input to the cosine signal processor 436.

As the motor rotation angular velocity ($\omega_1$) from the sine signal processor 420 and the motor rotation angular velocity ($\omega_2$) from the cosine signal processor 430 are generated, the determiner 451 determines whether the sine wave ($A_i$ sin $\theta$) is greater or smaller relative to the predetermined threshold 0.7 A, so that, based on the determination, the switcher 452 selects the motor rotation angular velocity ($\omega_1$ or $\omega_2$) of the sine wave signal or that of the cosine wave signal having the region with the greater signal value change.

Then, the motor rotation angular velocity ($\omega_n$) selected by the switcher 452 is split into two, die one being input to the integrator 461 so that the integrator 461 calculates the motor rotation phase ($\theta_n$), reflects the latest motor rotation angular velocity ($\omega_n$) and updates the rotation phase ($\omega_n$) of the motor 110.

And besides, the other one of the split motor rotation angular velocity ($\omega_n$) is output from the output unit 480 to the CPU 310 via the filter 481.

The motor rotation phase ($\theta_n$) calculated by the integrator 461 is output to the first and the second position information converters 463 and 464.

Then, in the first function value calculator 466, a function value sin $\theta_n$ taking the motor rotation phase ($\theta_n$) as a parameter is calculated.

In the second function value calculator 468, a function value cos $\theta_n$ taking the motor rotation phase ($\theta_n$) as a parameter is calculated.

The two-phase signal ($A_i$ sin $\theta$, $B_i$ cos $\theta$) from the encoder 120 is input to the sine signal processor 420 and the cosine signal processor 430 and, simultaneously, input to the amplitude detector 470.

The amplitude of the sine wave signal and the cosine wave signal is detected by the amplitude detector 470 by a predetermined timing cycle.

Specifically, the magnitude of the sine wave signal ($|A_i \sin \theta|$) when the value of the cosine wave signal is zero is stored as the amplitude $A_i$ of the sine wave signal and the detected amplitude $A_i$ is stored in the $A_i$ storage 472 of the amplitude data storage 471.

Specifically, the magnitude of the cosine wave signal ($|B_i \cos \theta|$) when the value of the sine wave signal is zero is stored as the amplitude $B_i$ of the cosine wave signal and the detected amplitude $B_i$ is stored in the $B_i$ storage 473 of the amplitude data storage 471.

The amplitude $A_i$ stored in the $A_i$ storage 472 is input into the first amplitude multiplier 467.

The sine function, value (sin $\theta_n$) calculated by the first function value calculator 466 is input into the first amplitude multiplier 467. The function value (sin $\theta_n$) and the amplitude data $A_i$ is multiplied in the first amplitude multiplier 467 to calculate the sine function value ($A_i$ sin $\theta_n$) as the internal position information.

The internal position information is output to the first subtracter 421 to be subtracted from the sine wave signal $A_i$ sin $\theta$ input from the encoder 120 to generate a difference signal.

The CPU 310 compares the motor rotation angular velocity ($\omega_n$) from the velocity calculator 400 with the target velocity and calculates the duty ratio of the current (i) to be applied to the motor 110 so that the motor rotation angular velocity ($\omega$) achieves the target value. The duty ratio allows the PWM (pulse width modulation) control to be performed on the motor 110, so that the motor 110 is rotated at the predetermined target velocity.

According to the first embodiment with the above-described configuration, the following advantages can be attained.

(1) Since the internal position information generator 460 generates the position information ($A_i$ sin $\theta_n$, $B_i$ cos $\theta_n$) of the motor 110 constantly reflecting the latest motor velocity information ($\omega_n$), the position information of the motor 110 as the latest as presumable can be obtained.

Accordingly, the difference between the position information signal ($A_i$ sin $\theta$, $B_i$ cos $\theta$) from the encoder 120 and the internal position information ($A_i$ sin $\theta_n$, $B_i$ cos $\theta_n$) generated by the internal position information generator 460 becomes a derivative value of the position information signal ($A_i$ sin $\theta$, $B_i$ cos $\theta$) from the encoder 120, and is namely the driving velocity ($\omega$) of the motor 110. Thus, when the position information signal ($A_i$ sin $\theta$, $B_i$ cos $\theta$) is input from the encoder 120, the difference of the both is instantly calculated to obtain the motor driving velocity ($\omega$), thereby attaining a significant effect of remarkably recovering the time-lag in the conventional ways.

(2) The velocity calculator 400 provides the motor driving velocity ($\omega_n$) without the time-lag, the central processing unit (CPU) 310 controls the motor 110 with the application of the motor driving velocity information ($\omega_n$) as the feedback signal, thereby providing extremely stable control system.

(3) Provision of the internal position information converter 463, 464 that calculates the function value applying the phase as the parameter allows the position information signal input from the encoder 120 to be merely the sine wave signal, and need not be the phase information itself. Accordingly, the encoder 120 (a photoelectric encoder, a capacitance encoder, a magnetic encoder etc.), which is typically used as a sensor, can directly be used as the sensor, and therefore, there is no need of special design change just for the servomechanism 100 of the present embodiment, and cost increase can be avoided.

(4) Since the signal switching section 450 selects the phase changing amount (the driving velocity information) calculated based on the signal having the signal value change being greater relative to the phase changing amount contained in the two-phase signal ($A_i$ sin $\theta$, $B_i$ cos $\theta$) from the encoder 120, the phase changing amount ($\omega$) can accurately be obtained as the motor velocity information in the entire region.

Additionally, the determination for the greater signal changing amount relative to the phase change does not require complicated arithmetical processing, but just requires simple comparison of the one signal value (the sine wave signal) with the threshold (0.7 A).

(5) Since the sign converter 440 is provided, the sign converter can convert the sign of the phase changing amount ($\Delta\theta$) in the increasing/decreasing direction in accordance with the rotation direction of the motor even if the phase changing amount is calculated as a minus value when the motor 110 is displaced in the plus direction, and obtain the driving velocity (the phase changing amount $\omega$) with the proper increasing/decreasing direction.

(6) The amplitude corrector 465 is provided and the amplitude of the signal (sine wave signal, cosine wave signal) input from the encoder 120 is detected by a predetermined timing. The detected amplitude is set as the amplitude of the sine wave signal and the cosine wave signal of the internal position information, so that the amplitude of the signal from the encoder 120 and the internally generated position information can be conformed to each other. When the amplitude of the two-phase signal from the encoder 120 is fluctuated, error on account of the fluctuation of the amplitude is not caused in calculating the velocity in the velocity calculator 400.

Consequently, the velocity detecting accuracy can be stabilized to stabilize the rotation velocity control of the motor 110.

Incidentally, though the amplitudes of the internal sine wave and cosine wave are corrected in the present embodiment, the amplitude of input sine wave and cosine wave may be corrected.

Second Embodiment

Next, a second embodiment of the present invention will be described below with reference to FIG. 6.

The basic configuration of the second embodiment is the same as the first embodiment, except for the configuration of an internal position information generator in the third embodiment.

Figure 6:
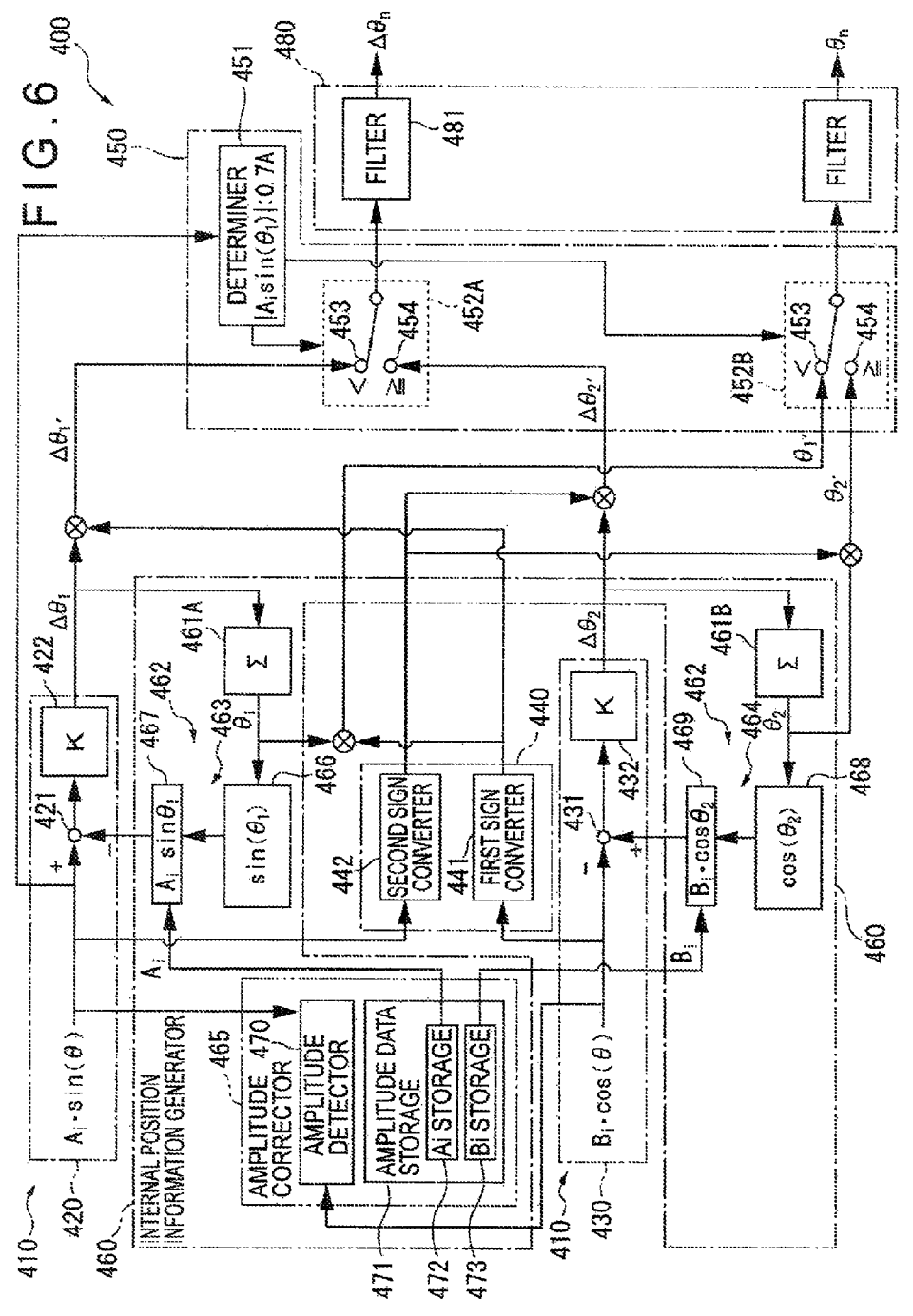

FIG. 6 is a block, diagram showing the configuration of a velocity calculator in the second embodiment.

In FIG. 6, the internal position information generator 460 includes the first internal position information converter 463 for the sine signal processor 420, and includes the second internal position information converter 464 for the cosine signal processor 430, which is the same as the first embodiment.

Meanwhile, in the first embodiment (FIG. 3), the provision of the integrator 461 was one. When the sine signal processor 420 and the cosine signal processor 430 respectively output the motor rotation angular velocities ($\omega_1$, $\omega_2$), the signal switching section 450 selects and inputs the one of motor rotation angular velocities ($\omega_1$ or $\omega_2$) to the integrator 461, and the integrator 461 integrated the motor rotation angular velocity ($\omega_1$ or $\omega_2$) to calculate the motor rotation phase. The motor rotation phase ($\omega_n$) calculated by the integrator 461 is output to the first Internal position information converter 463 and the second internal position information converter 464, so that these Internal position information converters respectively calculate the two pieces of internal position information ($A_i$ sin $\theta_n$, $B_i$ cos $\theta_n$).

On the other hand, a first integrator 461A and a second integrator 461B are provided in the second embodiment. To be more specific, as shown in FIG. 6, there are provided the first integrator 461A that integrates a motor rotation changing amount ($\Delta\theta_1$) output from the sine signal processor 420 based on the sine wave signal to calculate the motor rotation phase ($\theta_1$) based on the sine wave signal, and the second integrator 461B that integrates a motor rotation changing amount ($\Delta\theta_2$) output from the cosine signal processor 430 based on the cosine wave signal to calculate a motor rotation phase ($\theta_2$) based on the cosine wave signal.

The first integrator 461A integrates the rotation changing amount ($\Delta\theta_2$) of the motor 110 output from the first gain multiplier 422 and calculates the motor rotation phase ($\theta_1$). Then the first integrator 461A outputs the calculated motor rotation phase ($\theta_1$) to the first internal position information converter 463.

The second integrator 461B Integrates the rotation changing amount ($\Delta\theta_2$) of the motor 110 output from the second gain multiplier 432 and calculates the motor rotation phase ($\theta_2$). Then the second integrator 461B outputs the calculated motor rotation phase ($\theta_2$) to the second internal position information converter 464.

While the signal switching section 450 includes the determiner 451 and the switcher 452, so that the switcher 452 switches between the sine terminal 453 and the cosine terminal 454 with the switching unit in the same manner as the first embodiment, the switcher of the third embodiment includes a first switcher 452A for outputting velocity information and a second switcher 45213 for outputting position information.

The configuration of the first switcher 452A is the same as the switcher described in the first embodiment, the first switcher 452A switching between the sine terminal 453 and the cosine terminal 454 based on the determination of the determiner 451 and outputting the motor rotation angular velocity $\omega_n$. The motor rotation angular velocity $\omega_n$ ($\omega_1$ or $\omega_2$) is output to the CPU 310 (the central processing unit) via the filter 481.

Although the output signal $\omega_n$ (the motor rotation angular velocity $\omega_1$, $\omega_2$) from the switcher 452 is input to the integrator 461 in the first embodiment, in the third embodiment, the output signal $\omega_n$ from the first switcher 452A is not input to the integrators (461A, 461B).

The second switcher 452B switches between the sine terminal 453 and the cosine terminal 454 based on the determination of the determiner 451 with the switching unit.

Here, the signal in which the sign of the motor rotation phase ($\theta_1$) calculated by the first integrator 461A is converted by the first sign converter 441 is input to the sine terminal 453. And, the signal in which the sign of the motor rotation phase ($\theta_2$) calculated by the second integrator 461B is converted by the second sign converter 442 is input to the cosine terminal 454. The output from the second switcher 452B is output as the position information $\theta_n$ ($\theta_1$ or $\theta_2$) via a filter 481.

According to the second embodiment with the above-described configuration, the following advantage can be attained in addition to the advantage of the first embodiment.

In a case where the two-phase signal containing the sine wave signal and the cosine wave signal is output from the encoder 12, the velocity calculator 400 of the third embodiment includes the first integrator 461A and the first internal position information converter 463 corresponding to the sine signal processor 420 for processing the sine wave signal, and includes the second integrator 461B and the second internal position information converter 464 corresponding to the cosine signal processor 430 for processing the cosine wave signal.

Accordingly, the motor rotation angular velocity $\omega_1$ based on the sine wave signal can be calculated with the arithmetic processing merely based on the sine wave signal in the loop of the first integrator 461A and the first internal position information converter 463 applying the motor rotation changing amount $\Delta\theta_1$ based on the sine wave signal as the feedback information.

Similarly, the motor rotation angular velocity $\omega_2$ based on the cosine wave signal can be calculated with the arithmetic processing merely based on the cosine wave signal in the loop of the second integrator 461B and the second internal position information converter 464 applying the motor rotation changing amount $\Delta\theta_2$ based on the cosine wave signal as the feedback information.

Since the sine wave signal and the cosine wave signal are independently processed to separately calculate the phases (internal position information) by the first multiplier 461A and the second multiplier 461B, the internal position information can be accurately calculated by processing respective components while avoiding mixing of the phase information between the sine wave and the cosine wave.

As a result, driving velocity information can be accurately obtained.

Third Embodiment

Next, a third embodiment of the present invention will be described below with reference to FIG. 7.

The basic structure of the third embodiment is the same as the first embodiment, except that the motor rotation velocity is obtained based on a digital signal in which the signal from the encoder 120 is converted with an A/D converter are provided in the third embodiment.

Figure 7:
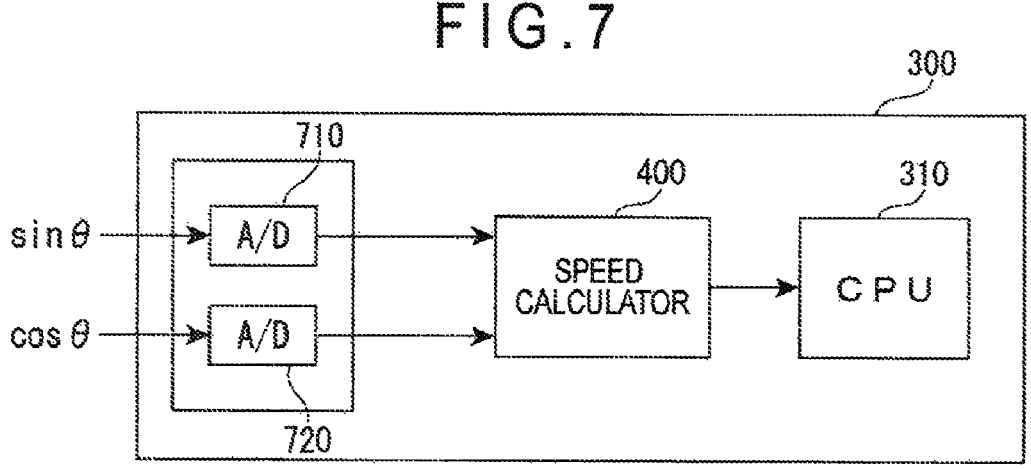
FIG. 7 is a block diagram showing the configuration of a third embodiment.

To be more specific, in FIG. 7, a first A/D converter 710 that performs A/D conversion on the sine wave signal from, the encoder 120, and a second A/D converter 720 that performs A/D conversion on the cosine wave signal from the encoder 120.

The velocity calculator (the signal processor) 400 includes the functions of the position information signal processor, the signal switching section, the internal position information generator etc., but these functions are achieved by a predetermined signal-processing program.

Note that the present invention is not limited to the above-described, embodiments, and modifications, improvements etc. are included in the present invention as long as the object of the present invention can be achieved.

Figure 8:
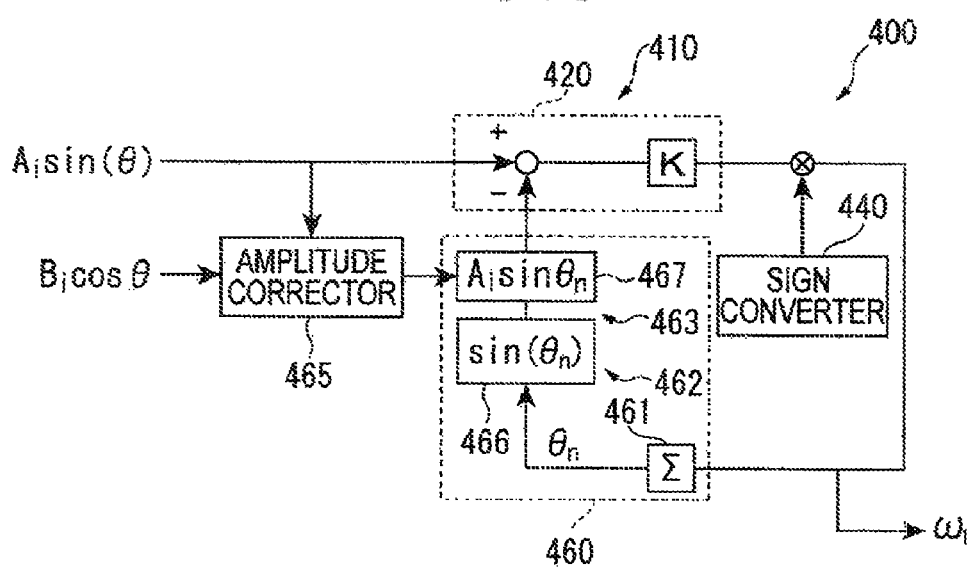
FIG. 8 is a block diagram showing a modification of the present invention.
Figure 9:
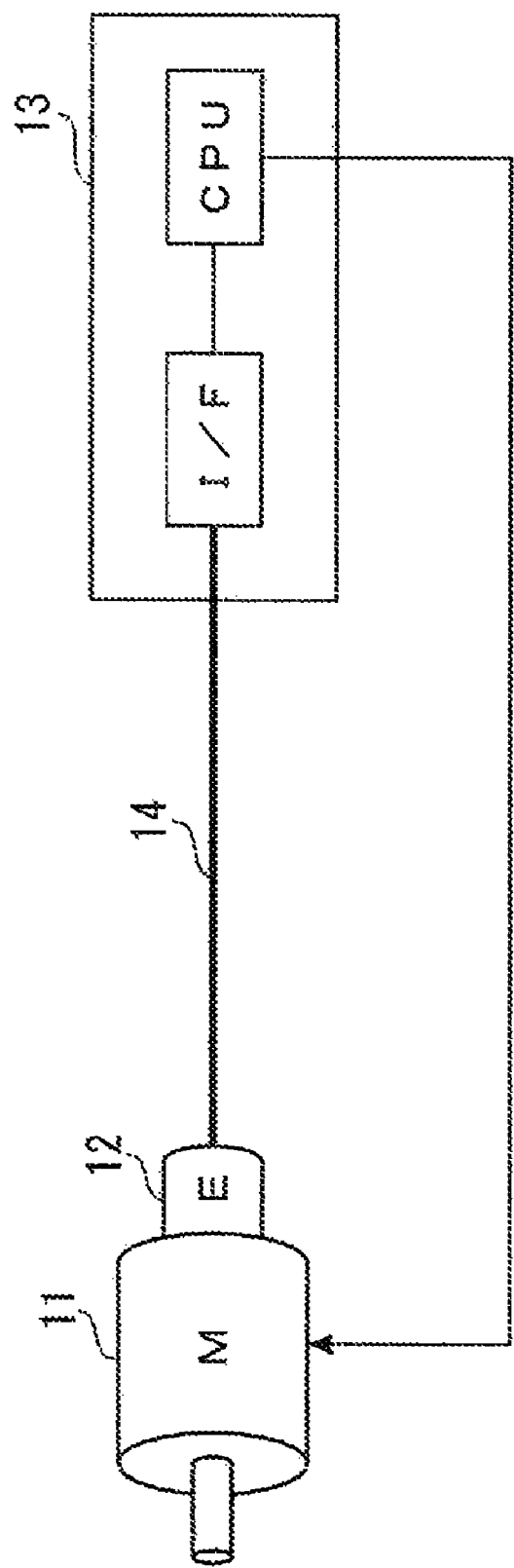
FIG. 9 is a block diagram showing the configuration of a conventional servomechanism.

For example, although the sine signal processor 420 and the cosine signal processor 430 respectively processing the two-phase signal (A sin θ, A cos θ) output from the encoder 120 are provided, and the output signal from the sine signal processor 420 and the output signal from the cosine signal processor 430 are switched in the first embodiment, as shown in FIG. 8, the position information signal processor 410 may only include the sine signal processor 420 for processing the sine wave signal (A sin θ) to output the motor rotation velocity (on) just based on the sine wave signal (A sin θ). Incidentally, it is necessary to correct the amplitude of the sine wave signal (A sin θ), where it is required to obtain the amplitude of the sine wave by detecting |$A_i$ sin θ| when the value of $B_i$ sin θ reaches "0" while monitoring the amplitude of $B_i$ sin θ by the amplitude corrector.

Although the object to be controlled is the motor 110 having the rotator, and the velocity calculator (the signal processor) 400 calculates the rotation velocity (the rotation phase) of the motor 110 based on the two-phase signal from the encoder 120, the driving body is not limited to the motor having the rotator, and may be a linear motor or the like. Particularly in the control of the linear motor, since the time-lag largely influences the control performance, the driving velocity is calculated promptly by the signal processing device (the velocity calculator) of the present invention, so that the velocity is controlled based on the calculated driving velocity, thus stably controlling the velocity without the time-lag.

Though the function value ($\sin\theta_n$, $\cos\theta_n$) taking the phase $\theta n$ as a parameter is calculated by the function value calculator while setting the amplitude of the function value as "1" and the amplitude ($A_i$, $B_i$) detected by the amplitude detector is multiplied by the amplitude multipliers 467 and 469 to bring the amplitude of the internal position information and the amplitude of the position information from the sensor into conformity with each other, other arrangement is possible. For instance, functions value $A_{i-1} \sin \theta n$ using the amplitude $A_{i-1}$ stored in the function value calculators 466 and 468 is calculated and $A_i/A_{i-1}$ is multiplied in the amplitude multiplier to be adjusted to the detected amplitude.

The priority application Number IP 2006-179186 upon which this patent application is based is hereby incorporated by reference.

What is claimed is:

1. A signal processing device for processing a position information signal output from a sensor in accordance with a driving position of a driver and detecting a driving velocity of the driver, comprising:
    a position information signal processor that processes the position information signal to calculate a driving velocity information of the driver;
    and an internal position information generator that uses the driving velocity information calculated by the position information signal processor to generate a latest presumed position of the driver as an internal position information,
    wherein the position information signal output from the sensor is a periodic function signal periodically changing in accordance with the driving position of the driver,
    the position information signal processor calculates a difference in phase between the position information signal from the sensor and the internal position information generated by the internal position information generator and outputs the difference in phase as the driving velocity information of the driver,
    the internal position information generator comprises: an integrator that integrates the driving velocity information to calculate a phase corresponding to the position information signal, and an internal position information converter, and
    the internal position information converter comprising an amplitude detector that detects a magnitude of the position information signal, a function value calculator that calculates a function value of the periodic function signal by taking the phase calculated by the integrator as a parameter, and an amplitude multiplier that multiplies the function value calculated by the function value calculator by the magnitude detected by the amplitude detector to calculate the internal position information.

2. The signal processing device according to claim 1, wherein the sensor also produces a second periodic function signal wherein
    the periodic function signal is a sine wave signal and the second periodic function signal a cosine wave signal having a phase difference of ninety degrees from the periodic function signal,
    the amplitude detector detects the magnitude of the periodic function signal when a magnitude of the second periodic function signal is zero and detects the magnitude of the second periodic function signal when the magnitude of the periodic function signal is zero.

3. A velocity detector comprising: a sensor that outputs a position information signal corresponding to a driving position of a driver; and a signal-processing device that processes the position information signal to detect a driving velocity of the driver,
    the signal-processing device comprising: a position information signal processor that processes the position information signal to calculate driving velocity information of the driver;
    and an internal position information generator that uses the driving velocity information calculated by the position information signal processor to generate a latest presumed position of the driver as an internal position information,
    wherein the position information signal output from the sensor is a periodic function signal periodically changing in accordance with the driving position of the driver,
    the position information signal processor calculates a difference in phase between the position information signal from the sensor and the internal position information generated by the internal position information generator and outputs the difference in phase as the driving velocity information of the driver,
    the internal position information generator comprises: an integrator that integrates the driving velocity information to calculate a phase corresponding to the position information signal, and an internal position information converter, and
    the internal position information converter comprising an amplitude detector that detects a magnitude of the position information a function value calculator that calculates a function value of the periodic function signal by taking the phase calculated by the integrator as a parameter, and an amplitude multiplier that multiplies the function value calculated by the function value calculator by the magnitude detected by the amplitude detector to calculate the internal position information.

4. A servomechanism, comprising
    a driver;
    a sensor that outputs a position information signal corresponding to a driving position of the driver;
    a signal-processing device that processes the position information signal to detect a driving velocity of the driver; and a central controller that compares the driving velocity of the driver with a predetermined target velocity and adjusts the driving velocity of the driver to the target velocity,
    the signal-processing device comprising: a position information signal processor that processes the position information signal to calculate a driving velocity information of the driver;
    and an internal position information generator that uses the driving velocity information calculated by the position information signal processor to generate a latest presumed position of the driver as an internal position information,
    wherein the position information signal output from the sensor is a periodic function signal periodically changing in accordance with the driving position of the driver,
    the position information signal processor calculates a difference in phase between the position information signal from the sensor and the internal position information generated by the internal position information generator and outputs the difference in phase as the driving velocity information of the driver,
    the internal position information generator comprises: an integrator that integrates driving velocity information to calculate a phase corresponding to the position information signal, and an internal position information converter the internal position information converter comprising an amplitude detector that detects a magnitude of the position information signal, a function value calculator that calculates a function value of the periodic function signal by taking the phase calculated by the integrator as a parameter, and an amplitude multiplier that multiplies the function value calculated by the function value calculator by the magnitude detected by the amplitude detector to calculate the internal position information.

* * * * *